United States Patent Office 2,831,781
Patented Apr. 22, 1958

2,831,781

WATER-SOLUBLE ADDITION COPOLYMERS OF A QUATERNARY AMMONIUM SALT OF AN ACRYLIC ACID ESTER OF AN AMINOMONO-HYDRIC ALCOHOL AND A MONOETHYLENI-CALLY UNSATURATED ESTER CONTAINING AN EPOXIDE GROUP

Robert William Upson, Fair Haven, and Vincent Joseph Webers, Red Bank, N. J., assignors to E. I. du Pont de Nemours and Company, Wilmington, Del., a corporation of Delaware No Drawing. Application November 9, 1955
Serial No. 546,013

17 Claims. (Cl. 117—103)

This invention relates to new addition copolymers containing epoxide groups and to cross-linked copolymers made therefrom. More particularly it relates to water-soluble addition copolymers of an ethylenically unsaturated quaternary monomeric salt and an ethylenically unsaturated monomer containing an epoxide group and to cross-linked copolymers made therefrom. The invention also relates to coating compositions, to hydrophobic films, and particularly to photographic films bearing an anti-static layer of such cross-linked copolymers and to their preparation.

An object of this invention is to provide a new class of water-soluble copolymers. Another object is to provide such copolymers which can be readily converted into water-insoluble copolymers. Yet another object is to provide such water-soluble copolymers which can be converted into water-insoluble films by heating films of the water-soluble copolymers for a short time at temperatures below 120° C. A further object is to provide hydrophobic materials with an anti-static surface coating. A still further object is to provide photographic films with a thin anti-static coating. Still other objects will be apparent from the following description of the invention.

It has been found that water-soluble di- and tricomponent addition copolymers containing quaternary salt and epoxide groups having considerable utility in the arts can be prepared by admixing an addition polymerization initiator with (a) a mixture of ethylenically unsaturated monomers comprising 25 to 95% by weight of a quaternary salt of an amino monohydric alcohol ester of an acrylic acid wherein the amino nitrogen is tertiary, including an α-alkacrylic acid, 5 to 35% by weight of an ethylenically unsaturated aliphatic ether or carboxylic acid ester containing an epoxide group and 0 to 40% by weight of an addition polymerizable vinyl type, i. e., vinyl or vinylidene compound and (b) a suitable inert solvent for said monomers and heating the admixture to a temperature below that at which the epoxy group is reactive, usually below 100° C. The polymerization takes place fairly rapidly and a water-soluble copolymer having a relatively high molecular weight, e. g., in excess of 5000 is obtained in a relatively short time, e. g., 20 to 300 minutes depending on the solvent employed and the reaction conditions. If an organic solvent is used, the polymer precipitates from solution as it is formed. It is recovered and can be dissolved in water and the aqueous solution used for coating it on, or applying it to, suitable materials or surfaces. Suitable solvents for the addition polymerization reaction include methanol, acetone, methyl ethyl ketone, ter.-butyl alcohol and mixtures of two or more of such solvents. Water/alcohol mixtures may also be used. When water/alcohol mixtures are used the pH should be about 7.0. In this case the copolymer may remain in solution.

The water-soluble copolymers containing epoxy groups can be converted into relatively water-insoluble cross-linked copolymers by heating them to temperatures in excess of 100° C. Aqueous solutions of the copolymers can be applied to the surface of a material to be treated and the coating dried and then cured or insolubilized by heating the dry coating to an elevated temperature.

In an important aspect of the invention, an aqueous solution of a water-soluble copolymer containing epoxide groups is applied to the surface of a sheet of a hydrophobic film, for instance, a sheet or film of a cellulose derivative, e. g., cellulose acetate, cellulose propionate, cellulose acetate butyrate; polyvinyl chloride poly(vinyl chloride co vinyl acetate); nylon, the polymethylene terephthalates described in Whinfield and Dickson U. S. Patent 2,465,319, and on the back surface of the vinylidene chloride copolymer coated oriented polyester films of Alles et al. U. S. Patent 2,627,088, and the layer completely dried by heating it to an elevated temperature for a short period so that no reaction of the epoxide takes place, e. g., at 95° C. for about 30 seconds. The dry layer of the water-soluble copolymer containing the epoxy groups is then cured or cross-linked by heating it to an elevated temperature. The time of curing will, of course, vary depending on the particular copolymer, temperature, degree of quaternization and pH, etc. In general, a temperature between 100° C. and 160° C. will be used over a period of 1 to 5 minutes. The shorter periods will be used at more elevated temperatures; for instance, 2 minutes will usually be adequate at 120° C. and 1 minute at 150° C.

The various monomers used to make the di- and tricomponent copolymers of this invention and their precursors are known in the prior art. Suitable tertiary amino monohydric alcohol esters of acrylic and α-hydrocarbon substituted acrylic acids in their quaternary salts are described in Graves U. S. 2,138,763. The degree of quaternization of these salts may range from 50% to 100%. In the case of certain salts which have an acid pH at a high degree of quaternization, it is best to use salts less than 100% quaternized. However, copolymers of the salts of higher degree of quaternization can be used if a neutralizing agent, e. g., triethylamine is used to buffer the polymerization mixture to a neutral or alkaline condition. The latter conditions prevent premature reaction of the epoxy rings during the polymerization, subsequent dissolving of the polymer, and the final coating, and drying operations.

Other useful monomeric quaternary compounds are described in Barney U. S. Patent 2,677,699, and particularly in the structural formula column 5 and in the examples of said patent.

Various suitable ethylenically unsaturated esters and ethers containing epoxide groups are described in the Dorough 2,524,432, Erickson 2,556,075, and Erickson 2,567,842 U. S. patents.

Suitable ethylenically unsaturated monomers which can be copolymerized with the two components just discussed include, in addition to vinylidene chloride (the preferred monomer), vinyl chloride, vinyl acetate, acrylonitrile, methyl acrylate, ethyl acrylate, methyl methacrylate and ethyl methacrylate. The compounds preferably contain a terminal ethylenic group ($CH_2=C<$).

Any of the conventional addition polymerization initiators can be used to copolymerise the monomers. Suitable initiators include benzoyl peroxide, tertiary butyl peroxide, tertiary butyl hydroperoxide, acetyl peroxide, cumene hydroperoxide, hydrogen peroxide, sodium peroxide, sodium perborate, and sodium persulfate; ammonium persulfate-sodium bisulfite, hydrogen peroxide-thiourea; and potassium persulfate-ferrous sulfate; and α,α'-azobis(isobutyronitrile), α,α'-azobis(α,γ-dimethylvaleronitrile), α,α'-azobis(α,γ,γ-trimethylvaleronitrile), α,α'-azobis(α-methylbutyronitrile) and α,α'-azo-bis(isobutyramidine hydrochloride).

The novel coating solutions of this invention, which are useful in forming anti-static layers or coatings on various materials and especially photographic film base, consist essentially of water and .05 to 1.0% by weight of the aforementioned copolymers. These coating solutions may contain minor amounts of wetting or dispersing agents, e. g., 0.01 to 1.0% by weight of a sodium or potassium salt of an alkyl sulfate or alkyl sulfonic acid of 8 to 18 carbon atoms or an alkylated naphthalene sulfonic acid, saponin, etc. and colloidal silica as a surface modifier, e. g., 0.01 to 0.1% by weight. In preferred compositions the copolymers contain 50 to 90 parts of the quaternary salt component (50% to 100% quaternized), 10 to 30 parts of the component containing the epoxy group and 0 to 30 parts of vinylidene chloride per 100 parts, by weight, of the copolymer.

The invention will be further illustrated by, but is not to be limited to the following examples, wherein the parts and percents are by weight unless otherwise indicated and all resistivity measurements were made at 40% relative humidity and 70° F. Resistivity measurements are recorded in ohms per square as described in "ASTM Standards 1952," part 6, pages 1031 and 1032, American Society for Testing Materials, Philadelphia, Pa. (1953).

EXAMPLE I

A. *Preparation of β-methacrylyloxyethylmethyldiethylammonium methylsulfate (90% quaternized)*

In a 3-liter, 3-necked flask equipped with a stirrer, thermometer, and dropping funnel, and surrounded with an ice bath, there were placed 2320 cc. (1865 grams) of methyl ethyl ketone and 1155 grams (6.24 moles) of distilled diethylaminoethyl methacrylate. The mixture was cooled to 10° C. in the presence of air and 710 g. (5.63 mole) of dimethyl sulfate was added with stirring at such a rate that the temperature did not rise over 20° C. When the addition was complete, the solution was stirred for an additional 0.5 hour at 20° C. The clear solution containing 50% by weight of β-methacrylyloxyethylmethyldiethylammonium methylsulfate was stored in the refrigerator under nitrogen. A sample diluted 1:10 with water had a pH of 9.75. The methyl ethyl ketone solution had a density of 0.968 at 25° C., $N_D^{25°}$=1.424, and a relative viscosity of 3.7 at 25° C. Titration of free base present indicated a degree of quaternization of 92%.

B. *Preparation of poly(β-methacrylyloxyethylmethyldiethylammonium methylsulfate co vinylidene chloride co glycidyl methacrylate)*

A 12-liter resin flask equipped with a stirrer, reflux condenser and nitrogen inlet tube, and surrounded by a hot-water bath was swept with nitrogen to remove air. In the flask there were placed 18 grams of α,α'-azobisisobutyronitrile, 4500 cc. of methyl ethyl ketone, 1188 grams of a 50% by weight solution of β-methacrylyloxyethylmethyldiethylammonium methylsulfate in methyl ethyl ketone, 594 grams of vinylidene chloride, and 162 cc. (177 grams) of glycidyl methacrylate. After sweeping a second time with nitrogen, and sealing the system under a slight positive pressure of nitrogen, the temperature of the water-bath was raised as rapidly as possible to about 55° C. The polymerization started within ten minutes after this the temperature rose to 53° C. in the polymerization vessel. The start of polymerization was evident when the polymer started to precipitate from solution. The polymerization was conducted for 30 minutes. The polymerization vessel was cooled to room temperature, the solvent and unreacted monomers were decanted, and the copolymer was ground with fresh methyl ethyl ketone. The methyl ethyl ketone/copolymer slurry was filtered. The crude copolymer, still wet with methyl ethyl ketone, weighted 905 g. This copolymer was soluble in water, insoluble in methanol, ethanol, acetone and methyl ethyl ketone. The crude copolymer was dissolved in 12 liters of water. The clear, colorless, solution analyzed for 3.88% solids, corresponding to a yield of 502 g. of copolymer (38% conversion based on total monomers). The relative viscosity of a 0.388% by weight solution was 13.5: that of a 0.194% solution was 6.7. A sample of the copolymer prepared by evaporation of water from the aqueous solution became elastic at about 95° C. Slight decomposition of the polymer occurred starting at about 150° C. but no true melting was noted up to 180° C.

A sample of copolymer, prepared as described above, was ground with methyl ethyl ketone, separated by filtration, washed with methyl ethyl ketone and then with ether, and dried in a vacuum desiccator. Elemental analysis gave N (Dumas)=3.75; Cl=1.73. A poly(β-methacrylyloxyethylmethyldiethylammonium methylsulfate co vinylidene chloride co glycidyl methacrylate) having the weight ratio of 80/3/17 respectively theoretically requires N=3.75, Cl=2.23.

EXAMPLE II

Two solutions were made up as follows:

*Solution A.*—One hundred twenty-seven grams of the 3.88% solution prepared in Example I was diluted to 1330 cc. with distilled water.

*Solution B.*—A solution of 3.5 cc. of water, 3.5 cc. of a 30% by weight of colloidal silica in water, and 19 cc. of a 5% by weight aqueous solution of saponin in 35% aqueous alcohol were mixed and allowed to stand for one hour. This solution was diluted with 540 cc. of water.

Solution B was then stirred into solution A. The pH was adjusted to 7.4. The viscosity of this solution was 7.0 centipoises at 20° C. The composition of this aqueous solution was copolymer—0.25%, silica—0.067%, saponin—.05%. A moving web of stretched (biaxially oriented) polyethylene terephthalate film was coated with this solution by passing the web under a roller into contact with the surface of the solution in a coating pan. The amount coated was regulated by a directed air flow which blew back the excess of solution into the coating pan. The coating was dried at 195° F. under a rapid convection of air, and heated 4.0 minutes at about 120° C. The coating weight of antistatic was 4 mg./ft.². The clear, non-tacky coating had a resistivity of $3 \times 10^{10}$ ohms per square. The coated film was treated in conventional photographic developing, rinsing, fixing, washing and bleaching, etc., solutions for the usual periods that an exposed photographic film is treated and it was found that the surface had a resistivity of $4 \times 10^{12}$ ohms per square. Oriented polyethylene terephthalate which had not been coated with the copolymer showed a resistivity greater than $3 \times 10^{15}$ ohms per square both before and after photographic processing.

EXAMPLE III

A polyethylene terephthalate film was coated on one surface with a suspension of a vinylidene chloride/methyl acrylate/itaconic acid copolymer (83/15/2) before stretching, as set forth in Alles et al. U. S. Patent 2,627,088. The coating was dried, and the coated polyethylene terephthalate film was biaxially oriented by stretching both longitudinally and laterally as described in said patent. The copolymer was then applied to the stretched film as described in said Example II above, over the vinylidene chloride/methyl acrylate/itaconic acid copolymer substratum. The coated surface had a resistivity of $8 \times 10^{10}$ ohms per square. After processing the resistivity was found to be $4 \times 10^{12}$ ohms per square.

EXAMPLE IV

*Preparation of β-methacrylyloxyethylmethyldiethylammonium methylsulfate/glycidyl methacrylate copolymer*

A 2-liter resin flask equipped with a stirrer, reflux condenser, and nitrogen inlet tube and surrounded by a hot water bath, was swept with nitrogen to remove air. In the flask were placed 2.0 grams of α,α'-azobisisobutyronitrile, 500 cc. of methyl ethyl ketone, 132 g. of 50% by weight solution of β-methacrylyloxyethylmethyldiethylammonium methylsulfate in methyl ethyl ketone and 18 cc. (19.7 g.) of glycidyl methacrylate. After sealing the system under a slight positive pressure of nitrogen, the temperature of the hot water bath was raised to 53°–55° C. The polymerization was conducted for 30 minutes after the first precipitate of polymer was noted. The precipitated copolymer was purified by grinding with fresh methyl ethyl ketone, as in Example I and dissolved in water to give a clear, colorless, viscous solution. Analysis of this solution showed that the conversion was 65%, based on monomers charged. The relative viscosity of a 0.67% solution was 46.4; that of a 0.335% solution was 20.0. A sample of copolymer, prepared as described above, was ground with methyl ethyl ketone, separated by filtration, washed with methyl ethyl ketone, and dried in a vacuum desiccator. Elemental analysis gave N (Dumas)=4.08%. This corresponds to 87 parts by weight of β-methacrylyloxyethylmethyldiethylammonium methylsulfate and 13 parts by weight of glycidyl methacrylate. A coating solution was made up containing 0.20% polymer, .053% colloidal silica (solids) and .05% saponin (solids). This material was applied to oriented polyethylene terephthalate film as in Example II. The surface resistivity of this film was $1 \times 10^{11}$ ohms per square. After treatment in conventional photographic developing, rinsing, fixing, washing, bleaching, etc. baths for the usual periods for photographic films, the average resistivity was $4 \times 10^{12}$ ohms per square.

EXAMPLE V

A polyethylene terephthalate film was coated on one side with the copolymer coating solution as described in Example IV. This film was coated on the reverse side with a photographic emulsion. After processing, this film had a resistivity of $2 \times 10^{12}$ ohms per square. Loops of this film, of a polyethylene terephthalate film without the above copolymer coating and of a cellulose triacetate film without said coating were conditioned at 20% relative humidity in an enclosure with a 35 mm. projector. Each loop was run twelve times through the projector, and samples from each were tested for particle adherence, by dipping them into a "static detector powder." This powder consisted of an intimate mixture of two differently colored pigments, one which is attracted to positively charged regions, and one which is attracted to negatively charged regions. Pigments of this type are described by Woodland and Ziegler, Modern Plastics, 28, No. 9, p. 95 (1951). Copious amounts of the powder adhered to the sample of cellulose triacetate film, and to the sample of polyethylene terephthalate film which had not been coated with the copolymer. This indicated the presence of positive and negative charges in patches and in fine lines parallel with the direction of travel of the film through the projector. The sample which had been coated with the copolymer, however, showed a negligible amount of adherence of the powder, indicating the substantial absence of static charges and little tendency to pick up dirt particles.

EXAMPLE VI

A copolymer was prepared as in Example IV, from 190 g. of a 50% solution of β-methacrylyloxyethylmethyldiethylammonium methylsulfate (90% quaternized) and 5 g. of glycidyl methacrylate. The ratio of monomers was 95 parts by weight of β-methacrylyloxyethylmethyldiethylammonium methylsulfate and 5 parts by weight of glycidyl methacrylate. The product of the reaction was dissolved in water to give a clear viscous solution. The conversion was 73% based on monomers charged. A 0.44% by weight aqueous solution had a relative viscosity of 20.3 at 23° C. and a 0.22% solution had a relative viscosity of 8.9 at 23° C. A coating solution was made up containing 0.23% copolymer, 0.06% colloidal silica and 0.05% saponin, and coated on biaxially oriented polyethylene terephthalate as in Example II. The clear, tack-free coating had a resistivity of $3 \times 10^{10}$ ohms per square. After treatment in the conventional photographic processing baths as described in Example II, the resistivity was $1 \times 10^{13}$ ohms per square.

EXAMPLE VII

A 50% solution in tertiary butyl alcohol of β-methacrylyloxyethylmethyldiethylammonium methylsulfate (90% quaternized) was prepared as in Example I from 1155 g. of diethylaminoethyl methacrylate and 710 g. of dimethylsulfate in 1865 g. of tertiary-butyl alcohol. A copolymer was prepared from 105 g. of this solution, 82.5 g. of vinylidene chloride, and 32.7 g. of glycidyl methacrylate dissolved in 425 cc. of tertiary-butyl alcohol in the presence of 0.6 g. of α,α'-azo-bis-isobutyronitrile. (Monomer ratios approx. 30/30/20.) After four hours at 50° C., 39.5 g. of crude polymer was obtained. This material was dissolved in 3,950 cc. of water, saponin was added in the amount of 2 g. (solids), and the solution was coated on oriented polyethylene terephthalate film as described in Example II. The surface resistivity of this film was $1 \times 10^{10}$ ohms per square. After treatment in conventional photographic processing baths as described in Example II, the resistivity was $4 \times 10^{12}$ ohms per square.

As previously indicated, the anions of the ethylenically unsaturated quaternary salts are not limited to the alkylsulfates and sulfonic acids, as the phosphate, perchlorate, chloride and bromide, etc. salts can be used. The salts of particular utility are those salts of strong sulfur acids (e. g., having an ionization constant greater than $1 \times 10^{-4}$) described in Barney U. S. Patent 2,677,699. Suitable specific quaternizing esters which will provide other anions in addition to those given above, are those of methane-, ethane-, decane-, dodecane-, benzene-, and cyclohexane-sulfonic acids. The corresponding aliphatic sulfates, phosphates, perchlorates, chlorides and bromides are also useful salt-forming compounds. The tertiary amino monomer component need not be completely quaternized, but it has been found that the degree of quaternization should be within the range of 50–100%, in order for the layer of copolymer in photographic film to have good antistatic properties after treatment in alkaline processing solution.

The proportion of oxirane (epoxide) oxygen that should be incorporated into the copolymer should be between 1.0 and 3.5% by weight. Glycidyl acrylate, glycidyl methacrylate and glycidyl α-chloroacrylate are epoxide-containing monomers which are particularly well suited for this purpose.

The epoxide-containing copolymers of this invention are useful for making antistatic coatings for surfaces other than films. Thus they can be used to make such coatings on polyethylene terephthalate fibers, polyamide fibers, and polyacrylonitrile fibers. They are also useful for making antistatic coatings on regenerated cellulose film, polymethyl methacrylate films and molded articles, cellulose triacetate film and various other shaped plastic articles, glass surfaces, etc. The copolymers are also useful in determination of relative humidity by resistance methods.

The water-soluble-epoxide-containing copolymers and their cross-linked or cured derivatives or products are useful as mordants for acid dyes, including the following dyes:

Anthracene Yellow GR (400% pure Schultz No. 177)
Fast Red S Conc. (Colour Index 176)
Pontacyl Green SN Ex. (Colour Index 737)
Acid Blue Black (Colour Index 246)
Acid Magenta O (Colour Index 692)
Naphthol Green B Conc. (Colour Index 5)
Brilliant Paper Yellow Ex. Conc. 125% (C. I. 364)
Tartrazine (Colour Index 640)
Metanil Yellow Conc. (Colour Index 138)
Pontacyl Scarlet R Conc. (Colour Index 487)
Pontacyl Rubine R Ex. Conc. (Colour Index 179)

It is obvious from the above that the aqueous solutions containing the water-soluble epoxide-containing copolymers of this invention can be admixed with waxes, e. g., paraffin wax, carnauba wax, etc.; insecticides, e. g., dichlorodiphenyltrichloroethane, manganese arsenate, barium fluosilicate, etc.; sulfur; to make coating compositions useful in coating films, filaments, fibers, cloth; and treating various botanical plants, etc.

An advantage of the present invention is that it provides a new class of water-soluble copolymers which have utility in various arts. Another advantage is that the copolymers can be applied to surfaces from aqueous solutions and then converted into water-insoluble films or layers. A further advantage is that new antistatic coatings which are resistant to aqueous alkaline solutions are provided by the invention. A still further advantage resides in the fact that the copolymers can be made in a relatively simple manner. Still other advantages will be apparent from the above description of the invention.

What is claimed is:

1. A water-soluble addition copolymer of a quaternary ammonium salt of an ester taken from the group consisting of acrylic and α-hydrocarbon-substituted acrylic acid esters of a saturated monoaminomonohydric alcohol in which the amino-nitrogen is tertiary, and a monoethylenically unsaturated aliphatic carboxylic acid ester containing an epoxide group.

2. A copolymer as set forth in claim 1 wherein said first ester is a methacrylic acid ester.

3. A water-soluble addition copolmer comprising 25 to 95% by weight of a quaternary ammonium salt of an ester taken from the group consisting of acrylic and α-hydrocarbon-substituted acrylic acid esters of a saturated monoaminomonohydric aliphatic alcohol in which the amino-nitrogen is tertiary, from about 5 to 35% of a monoethylenically unsaturated carboxylic acid ester containing an epoxide group and 0 to 40% of an addition polymerizable ethylenically unsaturated monomer containing a terminal $CH_2=C=$ group.

4. A copolymer as defined in claim 3 wherein said ammonium salt is 50 to 100% quaternized.

5. A copolymer as defined in claim 4 wherein said ethylenically unsaturated monomer is vinylidene chloride.

6. A water-soluble addition copolymer comprising 25 to 95% by weight of a 50 to 100% quaternized ammonium salt of an ester taken from the group consisting of acrylic and α-hydrocarbon-substituted acrylic acid esters of a saturated monoaminomonohydric aliphatic alcohol in which the amino-nitrogen is tertiary and 5 to 35% by weight of a methacrylic acid ester of an epoxy alcohol having a single epoxy oxygen bridging adjacent carbon atoms.

7. A copolymer as defined in claim 6 wherein the aminoalcohol is a dialkylamino alcohol wherein the alkyl groups contain 1 to 2 carbon atoms and the second ester is a glycidyl methacrylate.

8. A copolymer as defined in claim 7 wherein said salt is of an oxygen-containing strong sulfur acid.

9. A water-soluble addition copolymer comprising 25 to 95%, by weight, of diethylaminoethyl methacrylate quaternized to the extent of 50 to 100% with dimethyl sulfate, 5 to 35% of glycidyl methacrylate and 0 to 40% of vinylidene chloride.

10. A water-soluble addition copolymer comprising 25 to 95%, by weight, of diethylaminoethyl methacrylate quaternized to the extent of 50 to 100% with dimethyl sulfate, and 5 to 35% of glycidyl methacrylate.

11. An aqueous coating composition consisting essentially of water and 0.05 to 1.0% by weight of the addition copolymer defined in claim 1.

12. An aqueous coating composition consisting essentially of water containing 0.05 to 1.0% by weight of the addition copolymer defined in claim 6.

13. An aqueous coating composition containing .05 to 1.0%, by weight, of the addition copolymer defined in claim 9.

14. The process which comprises applying an aqueous solution of the copolymer defined in claim 1 to the surface of a hard polymeric material, drying the resultant layer and heating the dried layer to a temperature above 100° C. to crosslink said copolymer.

15. The process which comprises applying an aqueous solution of the copolymer defined in claim 6 to the surface of a hydrophobic polymeric film, drying the resultant layer and heating the dried layer to a temperature above 100° C. to crosslink said copolymer.

16. The process which comprises applying an aqueous solution of the copolymer defined in claim 9 to the surface of a hydrophobic polymeric film, drying the resultant layer and heating the dried layer to a temperature above 100° C. to crosslink said copolymer.

17. A hydrophobic polymeric film element bearing on a surface an anti-static coating comprising an essentially continuous layer of a crosslinked addition copolymer as defined in claim 1.

References Cited in the file of this patent

UNITED STATES PATENTS

| | | |
|---|---|---|
| 2,138,763 | Graves | Nov. 29, 1938 |
| 2,580,901 | Erickson | Jan. 1, 1952 |
| 2,677,699 | Barney | May 4, 1952 |